J. TUNBRIDGE.
Processes of Amalgamating Gold and Silver.
No. 145,603. Patented Dec. 16, 1873.
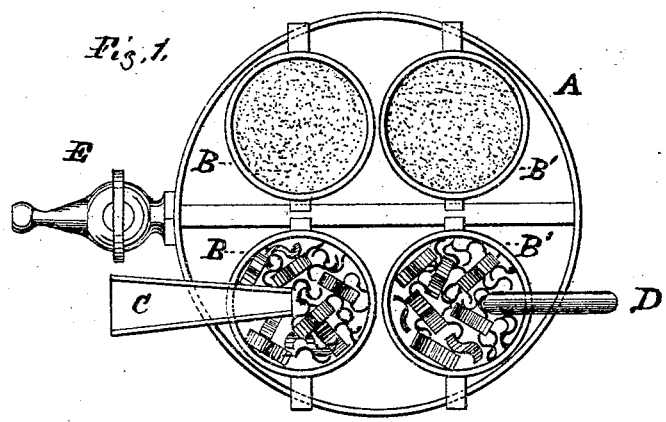
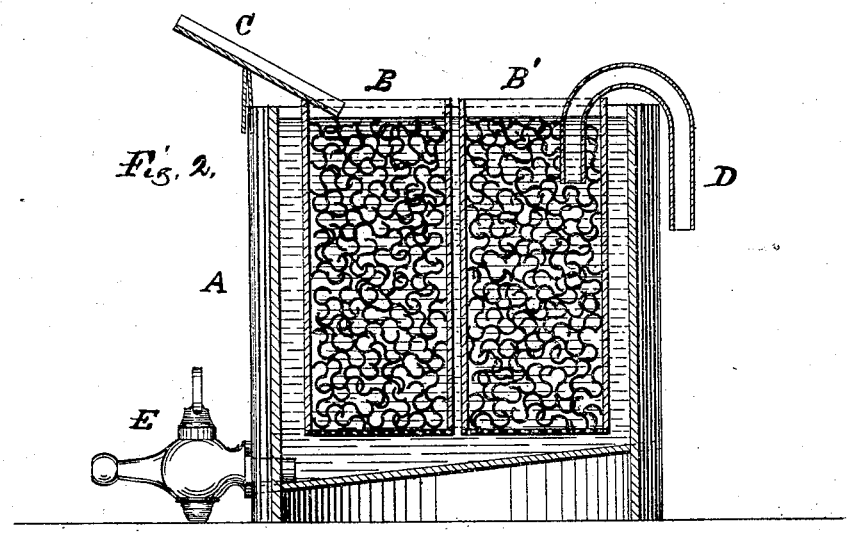

UNITED STATES PATENT OFFICE.

JOHN TUNBRIDGE, OF NEWARK, NEW JERSEY.

IMPROVEMENT IN PROCESSES OF AMALGAMATING GOLD AND SILVER.

Specification forming part of Letters Patent No. 145,603, dated December 16, 1873; application filed November 10, 1873.

*To all whom it may concern:*

Be it known that I, JOHN TUNBRIDGE, of the city of Newark, in the county of Essex and State of New Jersey, have invented certain new and useful Improvements in the Process of Amalgamating Gold and Silver; and I do hereby declare the following to be a full, clear, and exact description of the invention, such as will enable others skilled in the art to which it pertains to make and use it, reference being had to the accompanying drawings, which form part of this specification, in which—

Figure 1 is a top or plan view of the apparatus employed by me in this process. Fig. 2 is a vertical section of the same.

This invention has for its object a more convenient method of separating the precious metals from their ores, and more particularly in utilizing float gold and silver of the same metals held in suspension in the pulp. It is based upon the fact that the pulp containing the precious metals, if exposed to a greatly-extended surface of attractive matter, will be in a condition highly favorable to effect amalgamation. The invention consists in a surrounding reservoir, having suitable means for drawing off its contents, and in which are placed a number of vessels having perforated bottoms, and which are filled with amalgamated pieces of metal, which are submerged in the fluid that fills the reservoir.

In the drawing hereunto annexed, A is a reservoir, of any convenient form, having an inclined bottom, at the lower end of which is attached a tap or faucet, E, communicating with the interior. B B' are vessels, which are filled with amalgam. The washings or lama are passed from the inlet C through the top of the vessel B, and then circulate in the reservoir A, and, ascending into the vessel B', are discharged from thence at D. The settlings or coarser particles found in the reservoir A are discharged through the tap E. The amalgam, when sufficiently charged with the precious metals, is withdrawn and placed in a churn with mercury, or any other suitable means, for the purpose of withdrawing the greater part of the gold and silver from the amalgam.

By immersing the amalgamated strips or pieces of metal, they are removed beyond the action of the atmosphere, so as to prevent their oxidation, and thus their attractive force is kept from being impaired.

Having thus described my invention, what I claim as new, and desire to secure by Letters Patent, is—

1. The vessels B B', filled with submerged amalgamated pieces of metal, substantially as set forth.

2. Two or more vessels, having perforated bottoms, and filled with amalgamated strips or pieces of metal, which are submerged in the water of the reservoir, the vessels being arranged so that the washings or lama may be passed alternately through them, substantially as shown and described.

3. The reservoir A, in combination with the vessels B B' and tap E, substantially as described, for the purpose set forth.

In testimony that I claim the foregoing I have hereunto set my hand this 8th day of November, 1873.

JOHN TUNBRIDGE.

Witnesses:
OLIVER DRAKE,
JOHN W. COLLINS.